United States Patent [19]
Amason et al.

[11] 3,906,308
[45] Sept. 16, 1975

[54] AIRCRAFT LIGHTNING PROTECTION SYSTEM

[75] Inventors: Myron P. Amason, Stanton; Joseph T. Kung, Long Beach, both of Calif.

[73] Assignee: McDonnell Douglas Corporation, Santa Monica, Calif.

[22] Filed: Sept. 27, 1973

[21] Appl. No.: 401,388

[52] U.S. Cl. .............................. 317/2 E; 244/1 A
[51] Int. Cl.² ........................................ H05F 3/00
[58] Field of Search ............ 317/2 R, 2 E; 244/1 A; 174/2

[56] References Cited
UNITED STATES PATENTS

| | | | |
|---|---|---|---|
| 1,419,261 | 6/1922 | Howard | 317/2 E |
| 2,239,693 | 4/1941 | Bennett | 317/2 E |
| 2,982,494 | 5/1961 | Amason | 317/2 E |
| 3,498,572 | 3/1970 | Lumn | 317/2 E |

*Primary Examiner*—J. D. Miller
*Assistant Examiner*—Harry E. Moose, Jr.
*Attorney, Agent, or Firm*—D. N. Jeu; Walter J. Jason; Donald L. Royer

[57] ABSTRACT

Basic design criteria are established for the Zones 1, 2 and 3 aircraft regions defined in the zonal lightning protection design concept. In fulfilling the Zone 2 criteria, a lightning protection system utilizing dielectric materials in the form of coatings and/or films applied to critical components including boron or graphite epoxy composite skin panels, metallic or composite fuel tank access doors and other metal components located at the external surface of the aircraft, is used. This provides a complete dielectric surface shield of appropriate dielectric strength and thickness which electrically isolates the protected component from the swept-stroke and restrike lightning current channel. For large span skin panel protection, properly oriented and spaced foil or solid metal strips of appropriate dimensions are suitably affixed to the dielectric material surface and grounded to provide dwell points for the lightning current channel.

21 Claims, 13 Drawing Figures

ZONE 1
ZONE 2
ZONE 3

AIRCRAFT LIGHTNING PROTECTION SYSTEM

BACKGROUND OF THE INVENTION

Our invention relates generally to aircraft lightning protection systems and, more particularly, to a lightning protection system for advanced (boron and graphite epoxy) composite aircraft structures and the like.

Lightning strikes involving aircraft are a common occurrence. The majority of these lightning strikes occur at low altitudes, in and below the cloud level, and during the takeoff and landing phases of aircraft operation. The greater number of short hop commercial flights has increased the exposure rate of aircraft to the lightning environment. Military aircraft sometimes fly missions which require them to remain at low altitudes in a lightning environment for long periods of time. The improvement of modern flight instrumentation has made it possible for aircraft to fly between thunder clouds rather than avoiding the entire storm area. Also, the large number of aircraft flying today has resulted in numerous aircraft lightning strike events.

General design considerations for aircraft lightning protection are the prevention of structural failure, flight control system damage, fuel explosion, and electrical or avionics systems malfunction, caused by lightning encounter. Special considerations must be provided for the protection of advanced composite structures components such as modern solid state computers. Lightning protection may also be required to reduce the maintenance effort on a cost effective basis.

An overview of all lightning and static electricity related problems associated with the use of boron and graphite epoxy composite structures in aircraft indicated that various types of lightning protection methods should be developed for this type of structure so that they can be efficiently used in the various regions of aircraft. The lightning protection design requirements for this type of structure should be established based on the region of the aircraft where it is used. Environmental effects, as well as the serviceability and maintainability of proposed protection systems, should also be considered.

A review of industry activities in this area indicates that most of the effort has been concentrated on the development of conductive surface shielding methods to provide protection against the direct lightning stroke condition. An assessment of the aircraft lightning strike phenomena shows, however, that most aircraft structural parts are not located in regions requiring protection against such severe conditions. While conductive surface shielding methods can be used to provide more than the adequate protection for structures located in the less stringent swept-stroke and restrike regions, their usage may not be cost effective. In addition, the use of these protection methods can reduce, but not completely eliminate, lightning damage to composite structures.

SUMMARY OF THE INVENTION

In view of the foregoing considerations, we have conceived and developed an aircraft lightning protection system based upon the electrical isolation principle rather than the electrical conductive principle upon which most present aircraft lightning protection systems are based. The system provides lightning protection for critical components located primarily in the swept-stroke and restrike regions of the aircraft. The critical components can be boron or graphite epoxy composite skin panels, metallic or composite fuel tank access doors and other metal components located at the aircraft external surface. It is understood, of course, that whenever the term "aircraft" is used herein, it broadly includes all other mobile crafts and vehicles.

Our system utilizes dielectric materials such as coatings and/or films applied to the protected component, which is electrically conductive or partially conductive, to provide a complete dielectric surface (electrical isolation) shield of appropriate dielectric strength and thickness thereover. The lightning current channel is thus prevented from attaching to or transferring through the protected component. For large span skin panel protection, properly spaced foil or solid metal strips of appropriate dimensions can be suitably affixed or bonded on the dielectric material surface to provide dwell points for the swept-stroke and restrike lightning current channel. These strips can be optimumly installed lengthwise perpendicularly to the airstream, or satisfactorily installed lengthwise at a sufficient angle from the airstream direction. Of course, the external surfaces of the strips can be protected from corrosion with a suitable treatment as by applying a corrosion preventive coating such as alodine thereon, and still be readily lightning-accessible. The thickness of the layer of dielectric materials can also be graded and reduced toward the leading side of the skin panel surface for weight saving purposes.

BRIEF DESCRIPTION OF THE DRAWINGS

Our invention will be more fully understood, and other advantages and features thereof will become apparent, from the following description including that of an exemplary embodiment of the invention. The description is to be taken in conjunction with the accompanying drawings, in which.

DESCRIPTION OF THE PRESENT EMBODIMENT

In the following description and accompanying drawings including that of an illustrative embodiment of our invention, some specific values and types of materials are disclosed. It is to be understood, of course, that such values and types of materials are given as examples only and are not intended to limit the scope of this invention in any manner.

AIRCRAFT LIGHTNING STRIKE PHENOMENA

Lightning Strike Phenomena—Measured data indicate that the cloud-to-ground lightning strike phenomena generally contain three phases: the prestrike phase, the high peak current phase, and the heavy coulomb phase. The cloud-to-cloud and other types of lightning strike phenomena are not well understood due to the difficulty in collecting and measuring data. However, it is generally believed that they are similar to the cloud-to-ground strike phenomena but contain less energy. Therefore, the cloud-to-ground lightning strike characteristics are considered conservative when used as the design criteria for aircraft lightning protection.

Figure 1:
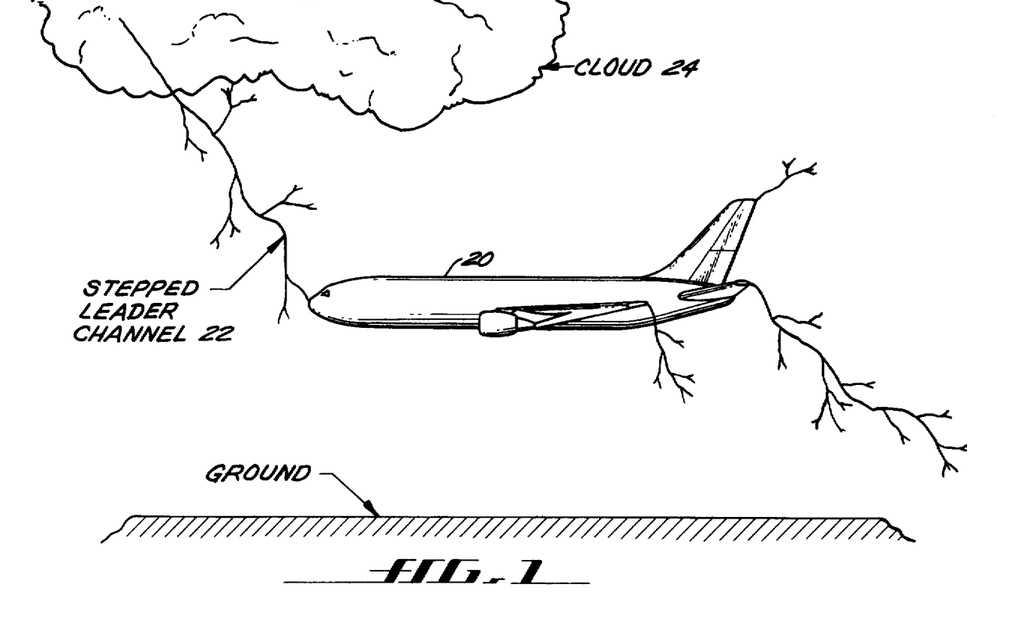
FIG. 1 is a perspective view, somewhat schematically shown, of an aircraft during a lightning prestrike phase.

Prestrike Phase — In FIG. 1, as a lightning stepped leader approaches an extremity of the aircraft 20, high stress streamers are initiated. The aircraft 20 becomes a part of the stepped leader channel 22 when one of these streamers is selected and contacted by the stepped leader. Propagation of the stepped leader will continue from other aircraft extremities until one of the branches of the stepped leader reaches the ground. The average velocity of propagation of the stepped leader is 0.5 foot per microsecond and the average charge in the whole stepped leader channel is 5 coulombs.

High Peak Current Phase — The return stroke starts immediately following the completion of the stepped leader channel 22 between cloud 24 and ground. It contains a high peak current with an average value of 10 to 20 kiloamperes and a maximum value of up to 200 kiloamperes. This high peak current has a fast rate of rise, an average rate of 10 kiloamperes per microsecond and a maximum rate of 100 kiloamperes per microsecond. The average time to half of the peak current value is 40 microseconds. The initial return stroke is usually followed by three to four high peak current restrikes at somewhat lower amplitude and at millisecond intervals.

Heavy Coulomb Phase — A low continuing current flow normally follows the initial return stroke, having a magnitude of 100 to 200 amperes. The average duration of the continuing current flow is 174 milliseconds with a maximum duration of up to 1 second. The average total charge transfer is 31 coulombs, but a maximum charge transfer can be up to 200 coulombs.

Figure 2:
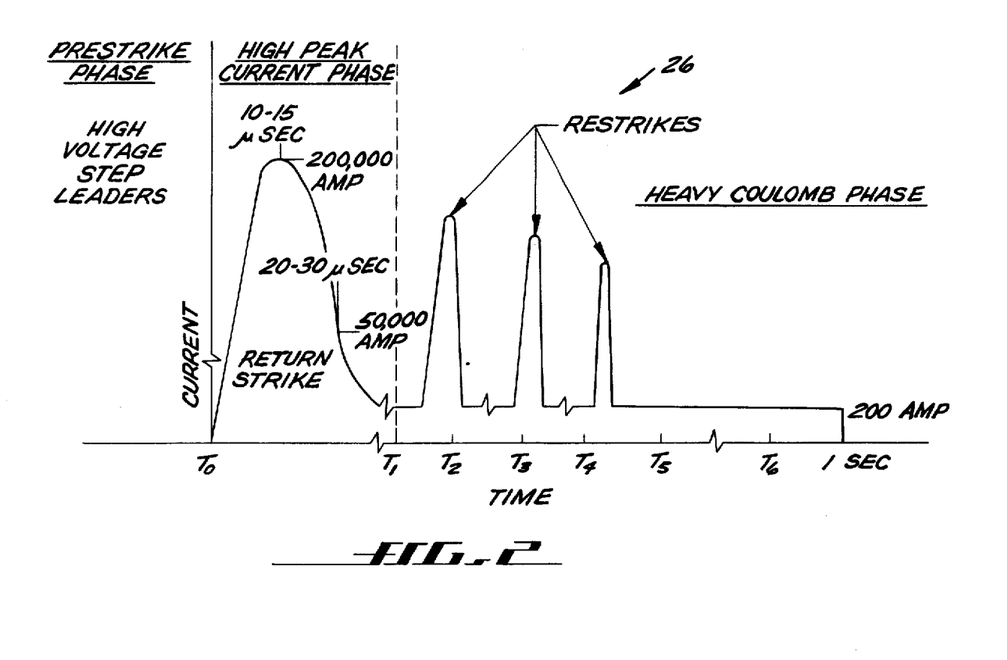
FIG. 2 is a graph showing the composite current waveform of a natural lightning stroke.

FIG. 2 shows the composite current waveform 26 of the high peak current and the heavy coulomb phase of a natural lightning stroke which is used as the design criteria for aircraft lightning protection.

Figure 3:
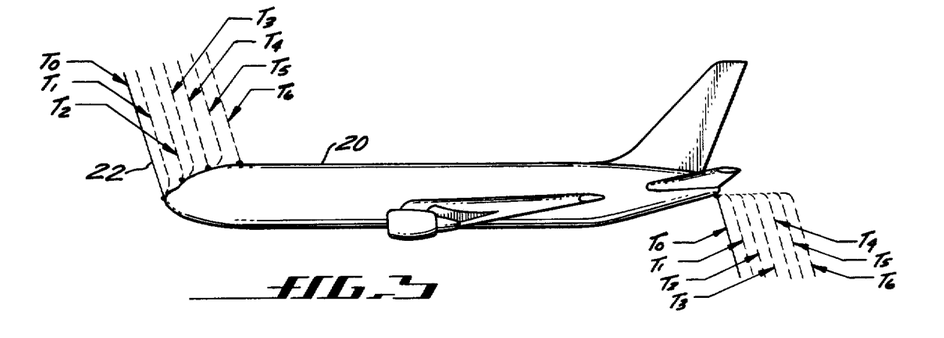
FIG. 3 is a side view of an aircraft shown intermittently contacted by a lightning channel to illustrate the swept-stroke phenomena.

Swept-Stroke Phenomena—The lightning channel is somewhat stationary in space while it is transferring charges. When an aircraft is involved, it becomes part of the channel. However, due to the speed of the aircraft and the length of time that lightning channel exists, the aircraft can move relative to the lightning channel. The aircraft, due to its speed, may move a distance of several hundred feet during the entire lightning event. When a forward extremity such as the aircraft nose and wing-mounted engines or fuel pods are involved, the aircraft surface moves through the lightning channel. As a result, the lightning channel may make intermittent contacts with the aircraft surface aft of the initial attach point. Thus, the lightning channel 22 appears to sweep back over the aircraft 20 surface as illustrated in FIG. 3. This is the swept-stroke phenomena. As the sweeping action occurs, local surface features of the aircraft can cause the lightning channel to contact and remain at various locations for different periods of time. Therefore, a portion or the entire heavy coulomb phase and the restrikes of lightning current may be involved in the swept-stroke action.

When a lightning restrike occurs, it usually follows the same lightning channel if it occurs within 100 milliseconds of the initial return stroke. Hence, restrikes can be part of the swept-stroke phenomena.

Damage Phenomena—The types of damage caused to aircraft components by lightning are related to the three phases of lightning current transfer discussed above.

Thermal Vaporization — The high peak current phase of the lightning stroke consists of the transfer of a large amount of charge in a short period of time, a few microseconds. This charge transfer can result in fast thermal vaporization of material. If this occurs in a confined area, a high vaporization pressure can be created. This pressure can be of sufficient magnitude to cause extensive structural damage. Extensive structural damage can be caused by a lightning stroke to an unprotected radome, for example. The vaporization of metallic and other type materials and the heating of the air inside the radome housing create the high internal pressure that causes structural failure. In some instances, large parts have been blown from the aircraft.

Burning and Eroding — The heavy coulomb phase of a lightning stroke can cause severe burning and eroding damage to aircraft structures. The most severe damage occurs when the lightning channel dwells or hangs on one point of the aircraft for the entire period of lightning current transfer. This can result in holes up to a few inches in diameter on the aircraft skin.

Magnetic Force — The current flow during the high peak current phase of lightning through sharp bends or corners of aircraft structure, can cause intensive magnetic flux interaction. In certain cases, the resulting magnetic forces can twist, rip, distort, and tear structures away from rivets, screws, and other fasteners.

Fuel Explosion — High stress streamers are initiated from the aircraft extremities during the prestrike phase. Certain types of fuel vents located at these extremities are susceptible to streamer conditions. If streamers are initiated from the fuel vent opening while the fuel vapor condition is critical, a local explosion may occur. If this explosion is not properly controlled, flames can propagate into the fuel tank area and cause a major fuel explosion.

The flow of lightning current through aircraft structures during the high peak current phase can cause sparking at poorly designed structural joints. If the sparking occurs inside the fuel tank or critical fuel vapor area, and the fuel vapor/air condition is critical, an explosion may occur.

The burning and eroding damage caused by the heavy coulomb phase of lightning current is critical when it occurs to the skin of at fuel tanks or fuel vapor areas. The resulting burn-through penetration and, in certain cases, hot spots on the internal surface of the skin can ignite fuel vapor and cause fuel explosions.

Electrical Current Conduction — The flow of lightning current, even a small portion of it through electrical components, can cause damage. In most cases, a varying degree of damage will result to both that component and the associated small gauge wiring.

Electromagnetic Coupling — The fast rate of rise of current during the high peak current phase can cause an electromagnetic coupling effect to the nearby electrical wiring systems and electronic components. This coupling effect can be severe enough to result in the following hazards:

1. Electrical shock to the pilot by the conduction through wiring circuits.
2. Failure of the electrical systems by the false trigger of relays.
3. Malfunction of the avionic and control systems by affecting solid-state devices.

ZONAL LIGHTNING PROTECTION DESIGN CONCEPT

Definition—The aircraft surfaces can be divided into three zones, with each zone having different lightning attachment and/or transfer characteristics. They are defined as follows:

Zone 1: Surfaces of the aircraft for which there is a high probability of direct lightning stroke attachment.

Zone 2: Surfaces of the aircraft for which there is a high probability of a lightning stroke being swept rearward from a Zone 1 point of direct stroke attachment.

Zone 3: The aircraft areas other than those covered by Zone 1 and Zone 2 regions.

Figures 4, 4A, 6, 6A:
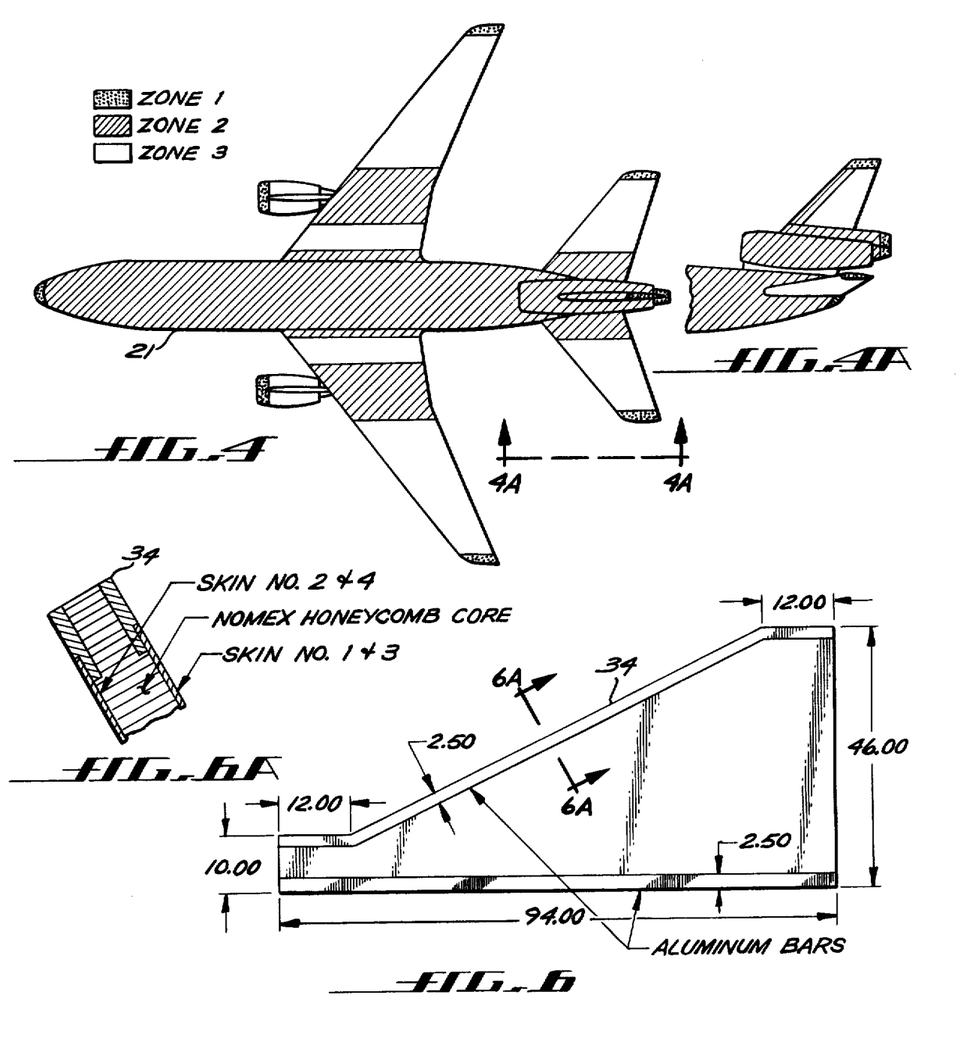
FIG. 4 is a plan view of an aircraft showing typical lightning strike zones thereof.
FIG. 4A is a fragmentary elevational view of the aircraft showing typical lightning strike zones thereof, as taken along the line 4A—4A indicated in FIG. 4.
FIG. 6 is a plan view of a composite test panel.
FIG. 6A is a fragmentary sectional view of the test panel, as taken along the line 6A—6A indicated in FIG. 6.

FIGS. 4 and 4A show lightning strike zones of a typical aircraft 21.

Attach Point Study—Lightning attach points include the extremities of the aircraft surface. In addition to these obvious attach points, lightning can attach to the leading edges of wings with a high degree of sweepback, certain high-lift leading edge devices, control surfaces during certain operational phases, canopies, and minor protrusions located near high field gradient points on the aircraft. All attach points including the nonobvious ones are identified in the early stages of aircraft design so that lightning protection zones and thus protection design requirements can be established.

The lightning strike zones of an aircraft can be determined through the laboratory attach point study. The aircraft model should be of adequate size to allow for the proper modeling of candidate nonobvious attach points. In one such model, the longest dimension is approximately 5 feet. It should be noted that the control surfaces of the wing are at the most critical positions for lightning strike attachment. A high voltage generator capable of producing an arc of two to three times the longest dimension of the aircraft model is preferably used.

The model aircraft may be mounted on a three-axis rotatable fixture so that it can be located at any position relative to the arc channel. Lightning tests are conducted from various striking positions and enough data collected to determine all direct lightning stroke attach points and thus Zone 1 regions of the aircraft.

Zone 2 regions of the aircraft can then be determined by identifying all surfaces which extend 18 inches laterally to each side of airflow lines passing through the Zone 1 forward protrusion attach points. Other areas of the aircraft are defined as the Zone 3 region (FIGS. 4 and 4A).

Design Criteria—Lightning protection design criteria are established on the basis of the Zone 1, 2, and 3 regions.

Zone 1 Region — The high peak current phase of the lightning stroke is involved at all points of direct attachment. Thus, the design of aircraft components located in the Zone 1 regions must consider the transfer of lightning current described above for this phase. In addition, if the lightning channel dwells or hangs on, such as in the trailing edge attach point case, the design must consider the heavy coulomb phase of the lightning current transfer. In the case of certain leading edge attach points, the lightning channel may not dwell or hang on long enough for the transfer of the heavy coulomb phase of lightning current; therefore, only the peak current phase may apply. In the fuel vent area, the protection against the prestrike streamering and stepped leader condition should also be considered.

Zone 2 Region — In Zone 2 regions the swept-stroke and restrike criteria are considered. The design of aircraft components located where lightning attachment can dwell or hang on, such as trailing edge areas, must consider the protection against both the restrike and the heavy coulomb phase of lightning current transfer. Components located at the other areas should consider the protection against the swept-stroke and restrike only.

Zone 3 Region — In Zone 3 regions the lightning current transfer criteria of both the high peak current phase and the heavy coulomb phase are considered. Efficient transfer of lightning current from one region to another on the surface of the aircraft is the principal requirement.

DESIGN CONSIDERATIONS

The first step after the establishment of the lightning strike zones is to evaluate the various aircraft components and identify the critical components requiring lightning protection. Design considerations for these critical components are determined according to their vulnerability, function, and location. Lightning protection design should also consider all inflight environmental effects as well as the serviceability and maintainability of proposed protection systems. Special design considerations for certain selected components are made relative to their locations in the Zone 1, 2, and 3 regions.

ADVANCED COMPOSITE AIRCRAFT

Graphite/Boron Epoxy Composite Aircraft — Graphite and boron epoxy composite structures are much less conductive both electrically and thermally than conventional metal structures; therefore, new lightning protection design concepts are required. The general design concept here is to prevent any lightning current from attaching to or transferring through these composite structures. If this is not possible, appropriate lightning current transfer paths should be established and properly designed to prevent damage to composite structures and associated structural joints resulting from the transfer of lightning current. Also, the aircraft as a whole should have external conductive paths to transfer lightning current from one extremity of the aircraft to the others across Zones 1, 2, and 3. Metal leading edge structure, which is normally needed for the rain erosion protection purposes for composite and plastic structures, can be used for this purpose in providing at least part of the external conductive paths.

Glass Fiber Reinforced Composite Aircraft — The glass or nonconductive fiber reinforced plastic aircraft is not immune to lightning strikes. In fact, a composite aircraft whether fabricated using conductive or nonconductive reinforcement fibers is more difficult to protect from lightning than an aircraft with a metal skin. This is because the conventional metal skin can satisfactorily shield metal control cables, fuel tanks, engines, and other critical components and the pilot and passengers from lightning. Special features must be added to a plastic aircraft to provide the necessary lightning protection.

An aircraft extremity, even though fabricated of a material normally considered to be nonconductive, can provide a high gradient point to which lightning may attach. A lightning stroke can enter the reinforced plastic structure causing severe damage if the structure is moisture contaminated or houses conductive components. The zones for a plastic aircraft may be somewhat different than for the conventional metal aircraft. Metal cables, wires, tubes, etc., may terminate halfway to the tip of the wing presenting a potential direct attach point at the center of the wing rather than at the wing tip. This would create different Zone 1, 2, and 3 regions than normally considered for metal aircraft.

Local attach point studies for plastic aircraft should be made on full-scale aircraft or full-scale sections, such as the nose radome, rather than scale models. This is because the thickness of the dielectric walls affects the streamering characteristics of the metal components within the structure. These tests would aid in establishing accurate Zone 1, 2, and 3 areas for a specific aircraft design.

DIELECTRIC SHIELDING DESIGN CONCEPT

A complete lightning protection system includes two fundamental parts: a conductive part which provides lightning current paths and an isolation part which shields the protected object from the lightning current paths. The isolation part of the protection system is as important as the conductive part. In the past few years, most of the research effort for advanced composite structures in the industry has been concentrated on the development of the conductive part of the system. The isolation part, however, appears to have been neglected.

Certain investigations have been made on the dwell time characteristics of swept-stroke attach points on metal skin surfaces in the fuel tank area. These investigations indicated that when coatings were used on the external metal surface located in swept-stroke regions, the lightning channel would dwell at specific points on the metal surface and not sweep smoothly as it would across the bare metal surface. The surface coatings provided a dielectric shield over the metal skin surface. This created a condition that made it difficult for the lightning channel to contact a new point during the sweeping event, thus prolonging the dwell time at each attach point.

An analysis was made which indicated that certain dielectric materials can be used to provide boron and graphite composite structures with dielectric shielding protection against lightning attachment in Zone 2 regions. Since the longer dwell time of the lightning channel at a point on the skin panel will result in a larger separation distance between attach points during the swept-stroke, this can be used to advantage for composite skin panels. The distance between lightning attach points can be extended by increasing the dielectric strength of the surface coating. Therefore, the attachment of lightning swept-stroke and restrike current to a certain span of composite skin panel can be prevented by the external surface application of materials with sufficient dielectric strength.

This design concept assumes that an attach point occurs forward of the composite skin panel on a metal surface. Metallic leading edge structures may be used for this purpose since it also provides ideal rain erosion protection for composite structures. If required, a metal surface component should also be used aft of the composite skin panel for the dwelling or hanging on of the lightning channel.

LABORATORY INVESTIGATIONS

Figure 5:
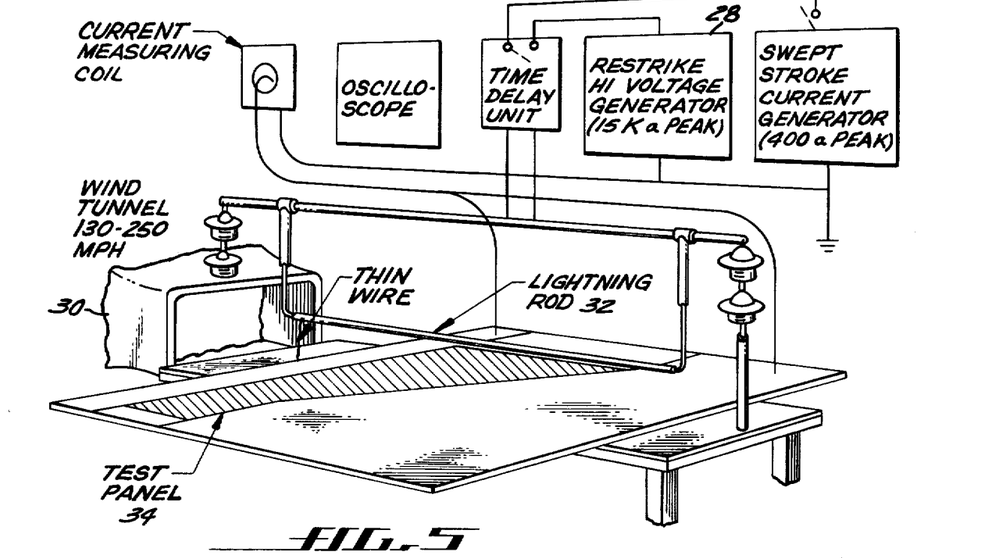
FIG. 5 is a perspective view, shown partially in diagrammatic form, of the swept-stroke and restrike lightning test facilities utilized for laboratory investigations.

Test Setup — Swept-stroke and restrike lightning test facilities were utilized for laboratory investigations. FIG. 5 shows the schematic diagram of the test setup. The typical swept-stroke current waveform reflects a peak amplitude of 500 amperes which decays exponentially to zero in about 20 milliseconds. The restrike high voltage generator 28 produces a current discharge of 15 kiloamperes peak amplitude at a frequency of 150,000 Hz and a settling time of 30 microseconds. The wind tunnel 30 can provide a wind velocity of from 130 to 250 mph during the lightning test. After the lightning channel is established between the lightning rod 32 and test panel 34, the wind blows the channel across the test panel. The upper end of the lightning channel also moves along the metal lightning rod 32 allowing the arc channel to follow the windstream. The lightning channel may be swept over a range of 30 to 55 inches from the initial attach point depending upon the wind velocity provided during the 20-millisecond discharging period.

A Polaroid camera is used to take the still photograph of each lightning test shot. In addition, a high-speed Fastex movie camera is used to record the movement of lightning channel at a speed of approximately 2,000 frames per second.

Test Samples — Boron and graphite epoxy composite panels with different types of dielectric surface coatings were lightning tested to demonstrate the feasibility of the dielectric-shielding concept. Common surface coating-type materials were tested first since all external composite skins would require them for environmental protection and other purposes. A test panel 34 is shown in FIGS. 6 and 6A and described in Table 1. Two such panels, with four composite skins, were tested. The polyurethane coating was selected for test since it is the type of finish coating that would normally be used over composite skins. On the No. 2 skin surface, an additional coating of 10-mil epoxy was used to provide extra dielectric shielding strength. The Astrocoat coating, which provides good rain erosion protection, was also tested.

TABLE 1

COMPOSITE TEST PANEL MATERIAL DESCRIPTION

| SKIN | COMPOSITE AND SURFACE COATING MATERIAL |
|---|---|
| 1 | 4 LAYERS GRAPHITE FILAMENT* (FERRO PREG C-1313 GLC 4T/E-350) AND 3 MIL POLYURETHANE COATING (DPS 4.50-62) |
| 2 | 4 LAYERS GRAPHITE FILAMENT* (FERRO PREG C-1313 GLC 4T/E-350), 10 MIL EPOXY COATING (DPM 110 CLEAR), AND 3 MIL POLYURETHANE COATING (DPS 4.50-62) |
| 3 | 4 LAYERS GRAPHITE FILAMENT* (FERRO PREG C-1313 GLC 5T/E-350), 2 LAYERS BORON FIBER** (NARMCO 5505), AND 3 MIL POLYURETHANE COATING (DPS 4.50-62) |
| 4 | 4 LAYERS GRAPHITE FILAMENT* (FERRO PREG C-1313 GLC 5T/E-350) AND 7.3 MIL ASTROCOAT RAIN EROSION COATING |

*FILAMENT LAYER ORIENTATION: +45°, −45°, −45°, +45°.
**FIBER LAYER ORIENTATION: 0°, 0°(PARALLEL TO THE STRAIGHT ALUMINUM BAR)

Figure 7:
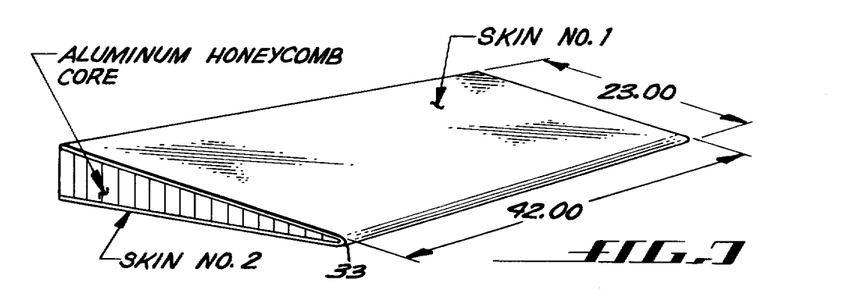
FIG. 7 is a perspective view of a graphite epoxy composite flap.

The attachment characteristics of swept-stroke and restrike lightning current on a graphite epoxy composite skin bonded to aluminum honeycomb core were also investigated. See FIG. 7 and Table 2 showing and describing two different skins bonded to the core of a composite flap 33.

TABLE 2

GRAPHITE EPOXY COMPOSITE FLAP MATERIAL DESCRIPTION

| SKIN | COMPOSITE AND SURFACE COATING MATERIAL |
|---|---|
| 1 | 4 LAYERS GRAPHITE FILAMENT* (NARMCO 50206) AND 3 MIL POLYURETHANE COATING (DPS 4.50-62) |
| 2 | 4 LAYERS GRAPHITE FILAMENT* (NARMCO 50206), 10 MIL EPOXY COATING (DPM 110 CLEAR), AND 3 MIL POLYURETHANE COATING (DPS 4.50-62) |

*FILAMENT LAYER ORIENTATION: +45°, −45°, −45°, +45°.

Test Results – During a typical swept-stroke lightning test, the lightning channel dwelled on the forward aluminum bar while being swept over the composite skin. In the latter part of the test, the lightning channel was reattached to the aft aluminum bar and detached from the forward dwell point without contacting the intervening composite skin. Test results indicate that the dielectric surface coating to this sample was sufficient to prevent lightning attachment to the composite skin for the span involved.

During a restrike test, the restrike was triggered at 16 milliseconds after the initiation of the swept-stroke. The composite skin was not contacted by lightning current during this ligntning test. In another successful restrike test, the restrike current did not follow the existign swept-stroke channel, but instead attached to the aft aluminum bar. This demonstrated that sufficient shielding strength was provided for the composite skin by the dielectric surface coating.

The effect of using exposed metallic structural ribs for the attachment of the lightning channel between dielectrically shielded composite skin panels has been investigated. Thin metal foil strips were used to simulate these ribs. The strips were applied both perpendicular and parallel to the windstream. Test results indicate that strips positioned perpendicular to the windstream can be effectively used for the reattachment of lightning current. Thus, this method can be used over dielectrically shielded composite skin surfaces for the protection of longer spans. The strips positioned parallel to the windstream, however, failed to provide any diversion function for the swept-stroke channel.

The effect of electrically grounding the graphite epoxy composite skin on the attachment characteristics of the swept-stroke lightning channel also has been investigated. In this case, a 24-inch air gap was intentionally provided aft of the trailing edge of the composite flap. It should be noted that for the ungrounded skin case, the lightning channel dwelled on the forward aluminum bar for the entire period of the lightning test. However, when the skin surface was grounded the lightning channel attached to the forward aluminum bar and then reattached to the trailing edge of the composite flap where it dwelled until the channel decayed.

Fifty swept-stroke test shots and 20 restrike test shots were made on boron and graphite composite skin panels shielded with various types of dielectric coatings. The span protections afforded for each configuration for both swept-stroke and restrike tests are summarized in Table 3. Test results have verified that the restrike condition is more critical than the simple swept-stroke condition. It may be noted that Astrocoat is an elastomeric coating, and Nomex is a nonconductive (specially treated kraft paper) honeycomb core.

TABLE 3

SUMMARY OF SWEPT-STROKE AND RESTRIKE LIGHTNING TEST ON ADVANCED COMPOSITE PANELS

| TEST SAMPLE | HONEY-COMB CORE | SPAN PROTECTION (INCHES) | |
|---|---|---|---|
| | | SWEPT STROKE | RESTRIKE |
| BORON + 0.003 POLYURETHANE | NOMEX | 51.5* | 19.0 |
| GRAPHITE + 0.003 POLYURETHANE | NOMEX | 35.5 | FAILURE |
| GRAPHITE + 0.010 EPOXY + 0.003 POLYURETHANE | NOMEX | 48.0* | 31.0 |
| GRAPHITE + 0.007 ASTROCOAT | NOMEX | 48.0* | 24.5 |
| GRAPHITE + 0.003 POLYURETHANE | ALUMINUM | 22.0* | FAILURE |
| GRAPHITE + 0.010 EPOXY + 0.003 POLYURETHANE | ALUMINUM | — | 22.0* |

*NO FAILURE (SAMPLE SIZE LIMITED)

Test data have been obtained using Kapton film as shielding material on a aluminum (instead of Nomex) honeycomb core composite test panel. The test panel is similar to that of FIG. 6 except that it is rectangular (4 by 5 feet, for example). The Kapton film was coated with the usual polyurethane coating. Various thicknesses of Kapton film were tested. These films were resin bonded and co-laminated with the boron and graphite fiber layers. The restrike current level was raised from 15 to 20 kiloamperes to simulate a more critical condition. Test results are summarized in Table 4. It is interesting to note that the span protection provided by the Kapton film over the graphite composite skin panel is almost the same as that over the boron composite skin although the graphite composite skin is much more conductive than boron. One significant phenomena observed during this series of tests is the surface flash-over phenomena. The lightning arc channel was seen contacting the surface of the Kapton film and flashing over it for a distance as far as 10 inches to a nearby aluminum grounding tape. The above results indicate that the dielectric shielding method may be used to protect metallic parts as well. Fuel tank access doors, for example, may be shielded by this type of dielectric film (typically 5 mil thickness) from swept-stroke and restrike attachment, and thus easily resolve their lightning protection problem.

TABLE 4

SPAN PROTECTION PROVIDED BY DIELECTRIC FILM OVER COMPOSITE SKIN PANEL

| COATING MATERIALS | 2 MIL KAPTON (DU PONT) AND 3 MIL POLYURETHANE COATING (DPS 4.50-62) | 5 MIL KAPTON (DU PONT) AND 3 MIL POLYURETHANE COATING (DPS 4.50-62) |
| --- | --- | --- |
| BORON PANEL | 32" | 52" |
| GRAPHITE PANEL | 28" | 52" |

The test results were analyzed and significant findings are as follows:

1. The boron epoxy composite skin has an inherent degree of dielectric shielding strength which makes this type of skin easier to protect than the graphite skin.

2. The aluminum honeycomb core underneath a composite skin does not have appreciable effect on the shielding characteristics of dielectric surface coatings when considering swept-stroke and restrike conditions.

3. A 10-mil coating of epoxy plus a 3-mil polyurethane coating system can provide over a 48-inch span protection for swept-stroke and 31-inch span protection for restrike when applied to the graphite epoxy composite skin. This protection system applied to the boron skin has not been tested. However, a longer span of protection is expected.

4. Metal foil strips or exposed metallic structural ribs, positioned perpendicular to the windstream over the dielectrically shielded composite skin surface can be used for the protection of longer spans. Metal strips or ribs positioned parallel to the windstream may not provide a diversion function to the swept-stroke channel.

5. Electrical grounding of the graphite epoxy composite skin surface may affect the swept-stroke lightning channel attachment characteristics by weakening the dielectric shielding protection system. Therefore, it may be desirable to isolate the composite skin surface from the adjacent metal structures.

6. An analysis of these results indicates that higher dielectric strength materials may be beneficial for large skin panel protection and also for weight savings considerations.

DESIGN CONSIDERATION CONCLUSIONS

Zone 1 Region – Structural components located in the Zone 1 lightning protection region should be protected against the direct lightning strike or the full lightning current waveform shown in FIG. 2.

Figures 8, 8A:
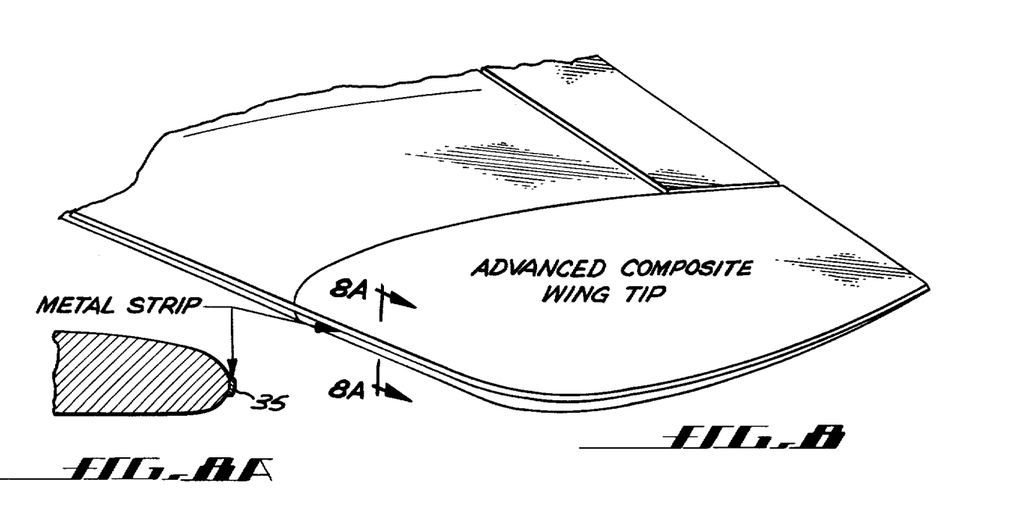
FIG. 8 is a fragmentary perspective view of an advanced composite wing tip including a metallic lightning strip protection system thereon.
FIG. 8A is a fragmentary sectional view of the composite wing tip and its metallic lightning strip, as taken along the line 8A—8A indicated in FIG. 8.

Solid Metal Protection — Our lightning protection design experience indicates that it is highly desirable to retain a minimum of conventional metallic structural components in the Zone 1 region for this type of protection. However, for certain designs, the weight reduction requirement may indicate the necessity of using all composite structural components in this region. In this case, it is possible to protect these structures using a metallic lightning strip 35 protection system in the extremity area as shown in FIGS. 8 and 8A. To prevent damage to the partially conductive composite structures, a nonconductive type bonding method is used to isolate the lightning strips from the structures. Lightning tests are conducted to demonstrate that lightning current will indeed attach to the metal strips and transfer through the designed lightning current path avoiding the composite structure path.

Conductive Surface Protection — Some conductive surface protection systems, such as the flame sprayed aluminum or silver coatings, the aluminum wire mesh, and the thin foil aluminum strips, have been developed by the industry. However, most of these protection systems may sustain considerable damage during lightning current transfer and require expensive repair. Thus, from a maintenance point of view, these systems are not desirable. Also, these protection systems can only reduce damage to advanced composite structures; they cannot completely eliminate it. The resulting hidden damage in the structures and the progressive damage by repeated contacts may become a problem.

Zone 2 Region – Structural components located in the Zone 2 lightning protection region should be protected against the swept-stroke and restrike phase of lightning strikes.

Figure 9:
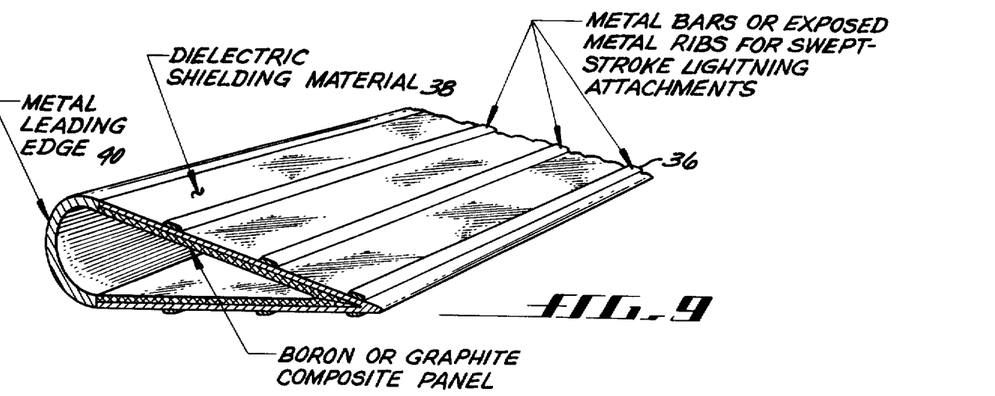
FIG. 9 is a fragmentary perspective view, shown partially in section, of an advanced composite aircraft structure including a dielectric shielding lightning protection system therefor.

Dielectric Surface Protection — Our developed dielectric shielding technique provides a suitable approach for this type of protection for boron and graphite epoxy composite structures. The principle is to apply dielectric materials over the composite skin panel and use their dielectric shielding strengths to prevent the reattachment of swept-stroke and restrike lightning current. FIG. 9 shows the dielectric shielding protection system. The metal bars or exposed metal ribs 36 are used for the attachment purposes of the swept-stroke and restrike lightning current in the case of a longer span of composite skin surface. The spacing between two adjacent metal elements 36 is a function of the dielectric strength of the surface shielding material 38. For higher dielectric strengths, wider spacings are allowed. This approach is based upon the assumption that sufficient structure is used in the Zone 1 frontal area forward of this portion of structure for the direct lightning stroke attachment. The use of a metal leading edge 40 is generally advisable from the rain erosion protection viewpoint for composite plastic structures.

Figure 10:
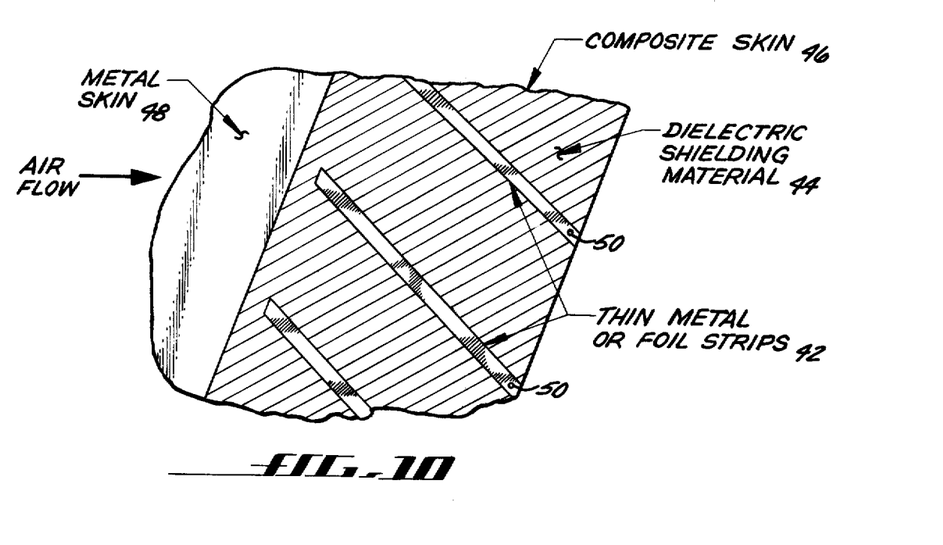
FIG. 10 is a fragmentary plan view of an advanced composite skin panel including a modified dielectric shielding lightning protection system therefor.

The metal elements 36 are optimumly positioned perpendicularly to the airstream. Metal bars or strips installed parallel to the airstream will not provide swept-stroke protection unless they extend to the leading edge of the vulnerable area. Where the metal bars or strips are installed parallel to the airstream aft of a strip-contacted metal area, the ligntning channel may sweep between two strips damaging the wall as it sweeps back. The modified system shown in FIG. 10 does, however, provide swept-stroke protection. In this instance, thin metal or foil strips 42 are bonded preferably by nonconductive adhesive to the dielectric coating or film 44 on the composite skin 46 at a selected angle relative to the airstream. The angle can be at about 45° from the air flow direction with a span between adjacent strips 42 of approximately 15 inches, for example. Of course, an angle of 90° from the air flow direction (perpendicular thereto) is optimum; however, the angle can be fairly small so long as the span or separation between strips 42 in the air flow direction is not too great to preclude proper protection by the dielectric coating or film 44. The strips 42 can be three-eighths inch wide aluminum foil 0.003 inch thick and 6 feet long, for example, which are spaced about 3 inches at their forward ends from the metal area 48 and grounded at their aft ends by screws 50 connected to suitable ground structure (i.e., part of the common metallic structure of zero reference potential as referred to the aircraft) such as a spar. These foil strips 42 of selected suitable thickness will not be vaporized normally since most of the lightning strike energy is dissipated at the initial attach point which would be in the forward metal area 48, and restrikes are of much less damaging heat energy.

The foil strips 42 can, of course, be positioned perpendicularly to the airstream over the lateral length of the composite skin 46. It is, however, preferable to ground the strips 42 at relatively short lengths thereof to reduce their impedance (inductance). Consequently, the strips 42 were angled at 45° to reach the grounded rear spar. Metal bars can be used instead of the adhesive foil strips 42 but the bars are thicker and may require the drilling of some undesirable holes in the composite skin 46 for the most permanent installation. The metal bars can be used in greater lengths before required grounding because of their greater cross sectional area. Where the metal bars are suitably installed perpendicularly to the airstream over the lateral length of the composite skin 46 shown in FIG. 10, the bars are preferably grounded at both ends. If only one end of each bar is to be grounded, the inboard (near the fuselage) end is preferably selected since the lightning current ordinarily travels longitudinally (front to rear) as indicated in FIG. 1. The metal bars can have a generally rectangular cross section (with rounded upper corners) of three-eighths inch width and one-eighth inch thickness, for example, and of suitable length (such as 12 feet).

As was described previously, laboratory simulated swept-stroke and restrike lightning tests have been conducted over large size (4 by 8 feet) boron and graphite epoxy composite skin panels. Test results have indicated that with the use of the 5-mil Kapton film as the surface shielding material 38, the spacing between two adjacent metal elements 36 shown in FIG. 9, or the span protection, can be as long as 48 inches for both boron and graphite panels.

The environmental effects of this protection system have been considered. The use of the Kapton film over composite panels provides a better weather protection to the composite panels. However, it may also accumulate static charges during flight causing streamering conditions and generating the p-static noise. The p-static noise interference problem is normally system oriented, affecting avionics systems operating in the frequency range between 200 kilohertz and 5 megahertz. Therefore, it is important to analyze susceptible avionics systems when using this protection system, and incorporate appropriate p-static protection as required.

Conductive Surface Protection — The aluminum mesh surface protection technique mentioned above is another approach. This technique utilizes thin aluminum wire fabric to cover the composite skin panel so that most of the swept-stroke and restrike lightning current will attach to and travel through the aluminum wire fabric. When using this protection system design, precautions should be undertaken to avoid the following hazards:

1. Sparking at bolts and joints in the fuel tank or critical fuel vapor area during the transfer of lightning current.
2. Structural strength degradation of the composite skin panel at the point of ligntning attachment and associated structural joints that provide lightning current paths.
3. Progressive undetectable structural degradation caused by repeated strikes during the life of the aircraft.
4. Corrosion at electrical bonding interfaces between aluminum mesh and metallic structural components.

Zone 3 Region – A lightning strike does not terminate on an aircraft. It enters the aircraft from one extremity and leaves from another. Therefore, structural components located in the Zone 3 lightning protection region should be capable of transferring lightning current across the region without damage.

Isolation Protection — The basic design concept here is to isolate lightning current from advanced composite structures located in this region by providing alternate conductive paths. Metal elements or strips may be used. However, they should be properly designed to avoid sharp bends or corners, which may be damaged by the magnetic forces during the transfer of lightning current.

Conductive Material Protection — If the isolation of composite structures is not possible, composite laminates and associated structural joints should be designed in such a manner so that they can transfer partial lightning current without damage. Techniques of increasing the lightning current carrying capabilities for boron and graphite epoxy composite laminates are being investigated The lightning current transfer characteristics through composite-to-composite and metal-to-composite structural joints with the objective of establishing design requirements for the safe transfer of various types of lightning current are also being studied.

Electromagnetic Shielding Protection — The electromagnetic shielding properties of composite skin panels are much poorer than conventional metal skin panels. Thus, electrical wiring systems located within structures containing composite skin panels are more vulnerable to lightning current impulse coupling. The following design guides can be undertaken to reduce the coupling voltage to a safe level:

1. The use of appropriate ground return paths for electrical wiring systems.
2. The shielding of exposed critical wiring by enclosing in a grounded metal conduit.
3. The twisting of wire pairs of critical circuits.
4. The proper orientation and location of wires within the structure.

ZONAL DIELECTRIC SHIELDING PROTECTION

Lightning protection design considerations and conclusions for an advanced composite aircraft have been described based upon the zonal aircraft lightning protection design concept. In the dielectric shielding protection system for advanced composite skin panels and other components, the dielectric shielding materials can be polyurethane coatings, epoxy coatings, and/or dielectric films such as the Kapton film. The thickness or dielectric strength of the coatings or films required depends upon the material and span of the composite skin surface in the air flow direction. Metal bars or exposed metal ribs can be used for the dwell or hang-on of the sweeping lightning channel if the span of skin panel is long and an unreasonable thickness of dielectric shielding material is required. The spacing between two adjacent bars or ribs can be determined as a function of the dielectric strength of the shielding material over the composite skin surface. Nonconductive materials such as adhesives, films, or sealants are used to isolate the metal bars or ribs from the composite material. The thickness of the shielding material can be graded and reduced towards the leading edge side of the skin surface for weight saving purposes.

A composite skin panel can have, for example, a layer of polyurethane primer or Kapton film of 2 mils thickness provided all over its surface. For weight saving purposes, a suitable dielectric coating can be added over the primer or film in a front section of the panel to bring the total thickness thereover to 5 mils. This total thickness can be progressively increased in successive sections until the aft section has a total thickness of 7 mils, for example. The sections can, of course, be separated by metal bars or strips adhesively bonded to the dielectric material and oriented perpendicularly lengthwise to the air flow direction. Dielectric protection can be provided by using (1) paint-type coatings such as epoxies, polyesters, phenolics, silicones, polyimides, acrylics, etc. or (2) elastomeric coatings such as polyurethanes, neoprenes, fluoroelastomers, etc. or (3) films such as Mylar (a polyester), Kapton (a polyimide), etc.

The dielectric shielding protection system can be used on boron, graphite or other epoxy type composite aircraft skin panels, and will eliminate swept-stroke and restrike lightning damage to the composite structures while other systems will only reduce the damage. Surface coatings which are normally required for the purpose of environmental protection or appearance are a part of this system. They will not contribute to any additional weight penalty and material and labor costs as will other systems. Dielectric films, such as the Kapton film manufactured by Du Pont, are lightweight, have high dielectric strength, and are high temperature materials. These dielectric films can be co-laminated with boron, graphite or carbon epoxy composite materials and cured in the same stage. Therefore, the labor cost for their application is not significant. The system can also be used to shield metallic parts, such as a fuel tank access door, from swept-stroke and restrike lightning attachment. This will eliminate any internal sparking problem in the fuel tank or critical fuel vapor area resulting from the transfer of lightning current. Finally, the system is not corrosive and is easy to maintain in service.

While an exemplary embodiment of this invention has been described above and shown in the accompanying drawings, it is to be understood that such embodiment is merely illustrative of, and not restrictive on, the broad invention and that we do not wish to be limited in our invention to the specific construction or arrangement described and shown, for various obvious modifications may occur to persons having ordinary skill in the art.

We claim:

1. In a zonal lightning protection system for aircraft and other vehicles, lightning protection means comprising:
    at least one layer of dielectric material applied over an ordinarily lightning-accessible surface of an aircraft component to be protected from lightning damage,
    said at least one layer being of a predetermined thickness and said dielectric material of said at least one layer being of a predetermined dielectric strength, and
    overall dielectric material layer thickness and dielectric strength including said predetermined thickness and dielectric strength of said at least one layer being of such character that attachment of a lightning channel to said surface of said component is prevented.

2. The invention as defined in claim 1 wherein said at least one layer of dielectric material includes a coating of dielectric material applied over said surface of said component.

3. The invention as defined in claim 1 wherein said at least one layer of dielectric material includes a film of dielectric material applied over said surface of said component.

4. The invention as defined in claim 1 further comprising at least one strip of conductive material positioned generally within the area of said at least one layer of dielectric material and lightning-accessible to provide dwell points for said lightning channel, said at least one strip of conductive material being connected directly to a selected part of a common metallic structure of zero reference potential for said aircraft.

5. The invention as defined in claim 2 wherein said coating of dielectric material applied over said surface of said component comprises an elastomeric coating.

6. The invention as defined in claim 3 wherein said film of dielectric material applied over said surface of said component comprises a polyimide film.

7. The invention as defined in claim 4 wherein said at least one strip of conductive material includes a foil strip of conductive material affixed over said at least one layer of dielectric material.

8. The invention as defined in claim 4 wherein said at least one strip of conductive material includes a bar strip of conductive material affixed over said at least one layer of dielectric material.

9. The invention as defined in claim 4 wherein said at least one strip of conductive material is oriented to extend angularly with respect to the direction of normal air flow over said at least one layer of dielectric material due to motion of said aircraft, said at least one strip of conductive material being so constructed and arranged that said lightning channel is able to contact said at least one strip of conductive material when said lightning channel sweeps in said direction of normal air flow over said at least one layer of dielectric material.

10. The invention as defined in claim 9 wherein said at least one strip of conductive material is oriented to extend perpendicularly with respect to said direction of normal air flow over said at least one layer of dielectric material.

11. In a zonal lightning protection system for aircraft and other vehicles, lightning protection means comprising:
    at least one layer of dielectric material applied over an ordinarily lightning-accessible and at least semiconductive surface of an aircraft component to be protected from lightning damage, said at least one layer being of a predetermined thickness and said dielectric material of said at least one layer being of a predetermined dielectric strength, and overall dielectric material layer thickness and dielectric strength including said predetermined thickness and dielectric strength of said at least one layer being of such character that attachment of a lightning channel to said surface of said component is prevented; and a plurality of conductive material strips positioned and spaced generally within the area of said at least one layer of dielectric material and lightning-accessible to provide dwell points for said lightning channel, said conductive material strips being all connected directly to selected parts of a common metallic structure of zero reference potential for said aircraft.

12. The invention as defined in claim 11 wherein said conductive material strips are oriented to extend angularly with respect to the direction of normal air flow over said at least one layer of dielectric material due to motion of said aircraft, and the spacing between two adjacent ones of said conductive material strips is predetermined as a function of said overall dielectric material layer thickness and dielectric strength, said conductive material strips being so constructed and arranged that said lightning channel is able to contact at least one of said conductive material strips when said lightning channel sweeps in said direction of normal air flow over said at least one layer of dielectric material.

13. In an aircraft or other vehicle, the combination with an aircraft component including a normally forward conductive surface and a normally aft partially conductive surface, of:

at least one layer of dielectric material applied over said partially conductive surface, said at least one layer being of a predetermined thickness and said dielectric material of said at least one layer being of a predetermined dielectric strength, and overall dielectric material layer thickness and dielectric strength including said predetermined thickness and dielectric strength of said at least one layer being of such character that attachment of a lightning channel to said partially conductive surface is prevented.

14. The invention as defined in claim 13 further comprising at least one strip of conductive material positioned generally within the area of said at least one layer of dielectric material and lightning-accessible to provide dwell points for said lightning channel, said at least one strip of conductive material being connected directly to a selected part of a common metallic structure of zero reference potential for said aircraft.

15. The invention as defined in claim 14 wherein said at least one strip of conductive material is oriented to extend angularly with respect to the direction of normal air flow over said at least one layer of dielectric material due to motion of said aircraft, said at least one strip of conductive material being so constructed and arranged that said lightning channel is able to contact said at least one strip of conductive material when said lightning channel sweeps in said direction of normal air flow over said at least one layer of dielectric material.

16. The invention as defined in claim 1 wherein said at least one layer of dielectric material applied over said surface of said component is progressively increased in total thickness in the direction of normal air flow thereover due to motion of said aircraft.

17. The invention as defined in claim 4 wherein said at least one positioned strip of conductive material includes an environmental protection coating provided on exposed surfaces thereof.

18. The invention as defined in claim 11 wherein said positioned conductive material strips include respective environmental protection coatings provided on exposed surfaces thereof.

19. The invention as defined in claim 12 wherein said conductive material strips are oriented to extend perpendicularly with respect to said direction of normal air flow over said at least one layer of dielectric material.

20. The invention as defined in claim 14 wherein said at least one positioned strip of conductive material includes an environmental protection coating provided on exposed surfaces thereof.

21. The invention as defined in claim 15 wherein said common metallic structure on said aircraft includes airframe structure thereof and said at least one strip of conductive material is oriented to extend angularly with respect to said direction of normal air flow over said at least one layer of dielectric material so that at least one end of said at least one strip of conductive material can be connected directlly to a selected part of said airframe structure, said at least one strip of conductive material being so constructed and arranged that it is relatively short length to reduce its impedance when connected to said airframe structure part at a chosen location.

* * * * *